Feb. 12, 1924.

F. S. CURRIE

SNOWPLOW

Filed Sept. 26, 1921    3 Sheets-Sheet 1

1,483,080

Inventor
F. S. Currie
By A. Milton Buck
Attorney

Feb. 12, 1924.

F. S. CURRIE 1,483,080

SNOWPLOW

Filed Sept. 26, 1921

Inventor
F.S.Currie

By Whitton Buck

Attorney

Feb. 12, 1924.  
F. S. CURRIE  
SNOWPLOW  
Filed Sept. 26, 1921   3 Sheets-Sheet 3  
1,483,080
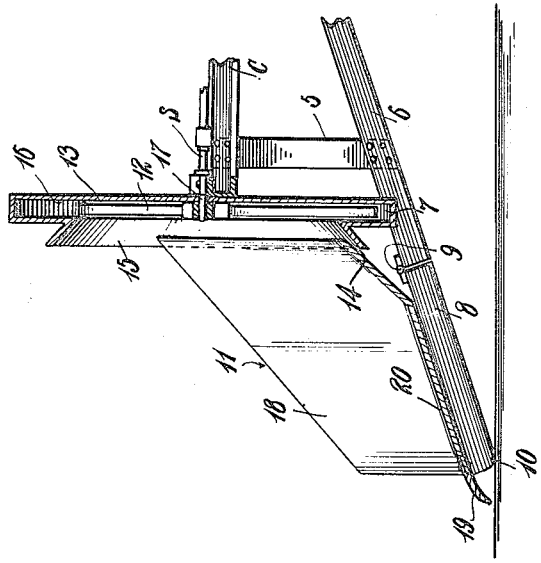
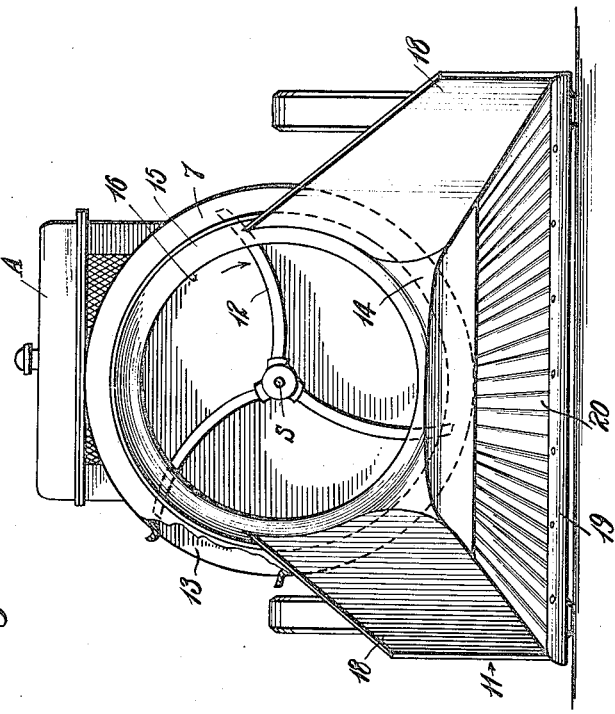
Inventor  
F. S. Currie  
By Albritton Buck  
Attorney Patented Feb. 12, 1924.

1,483,080

UNITED STATES PATENT OFFICE.

FRANK SHIELDS CURRIE, OF WEBSTER CITY, IOWA.

SNOWPLOW.

Application filed September 26, 1921. Serial No. 503,263.

*To all whom it may concern:*

Be it known that I, FRANK S. CURRIE, a citizen of the United States, residing at Webster City, in the county of Hamilton and State of Iowa, have invented certain new and useful Improvements in Snowplows, of which the following is a specification.

This invention relates to snow-plows, and more specifically to improved snow-shovelling attachments for automobiles, tractors, trucks and other motor driven vehicles.

One object of this invention is to provide an improved, thoroughly practical and efficient snow-plow which can be quickly and easily attached to any automobile of ordinary construction, and which will remove the snow from the path of the automobile, and discharge it laterally of the path. That wherever the word automobile is used in this specification it is intended and does include tractors, trucks and any other motor driven vehicle.

Another object of this invention is to provide an improved snow-scoop which includes rearwardly converging walls and a bottom or floor, the latter comprising a series of rearwardly converging corrugations which co-operate with the walls for evenly concentrating the snow preparatory to passing it through the open rear end of the scoop.

A further object is to provide a device of this character with one or more air inlets, so that the rotation of the fan sucks air upward through these inlets and thereby assists in passing the snow from the scoop into a channel in which the fan rotates.

A further object is to provide a device of this character which is of comparatively simple construction, and can be manufactured at a relatively low cost.

Further objects and advantages will be pointed out or implied in the following details of description, in connection with the accompanying drawings in which:

Figure 3 is a front elevation.

Figure 4 is a vertical sectional view along the line 4—4 of Figure 2.

Figure 1:
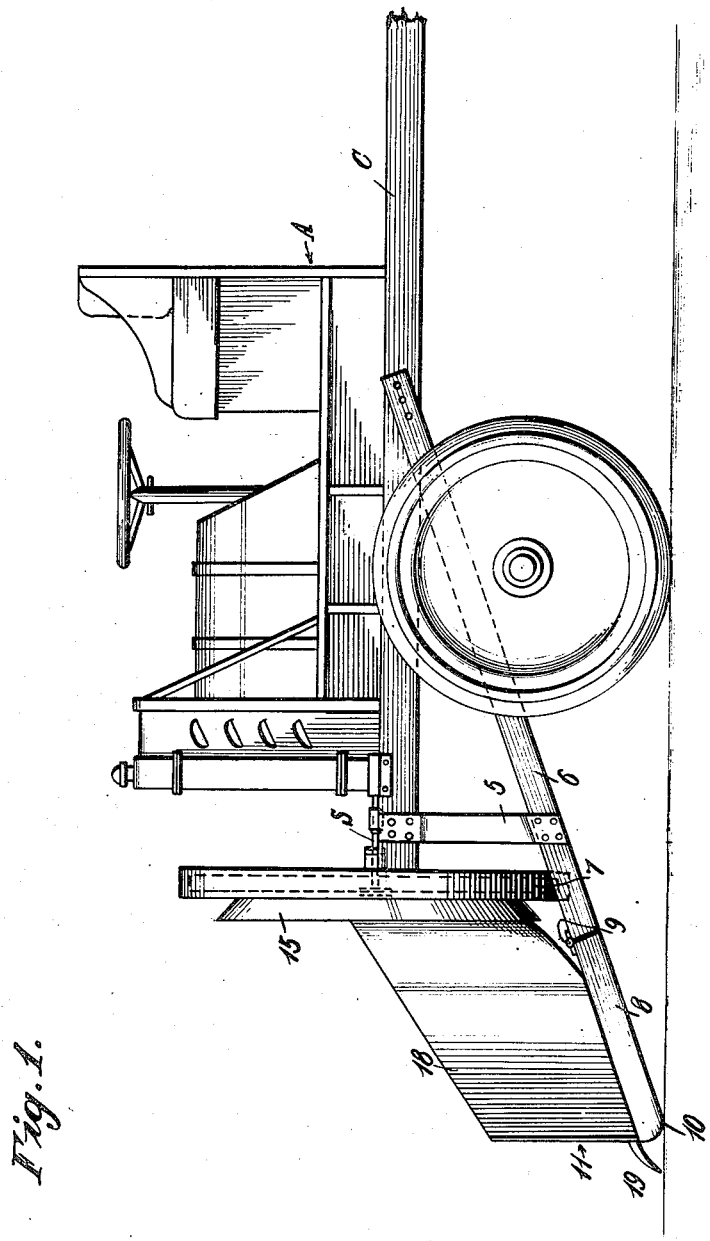
Figure 1 is a side elevation of my improved snow-shovelling device attached to the front end portion of an automobile.
Figure 2:
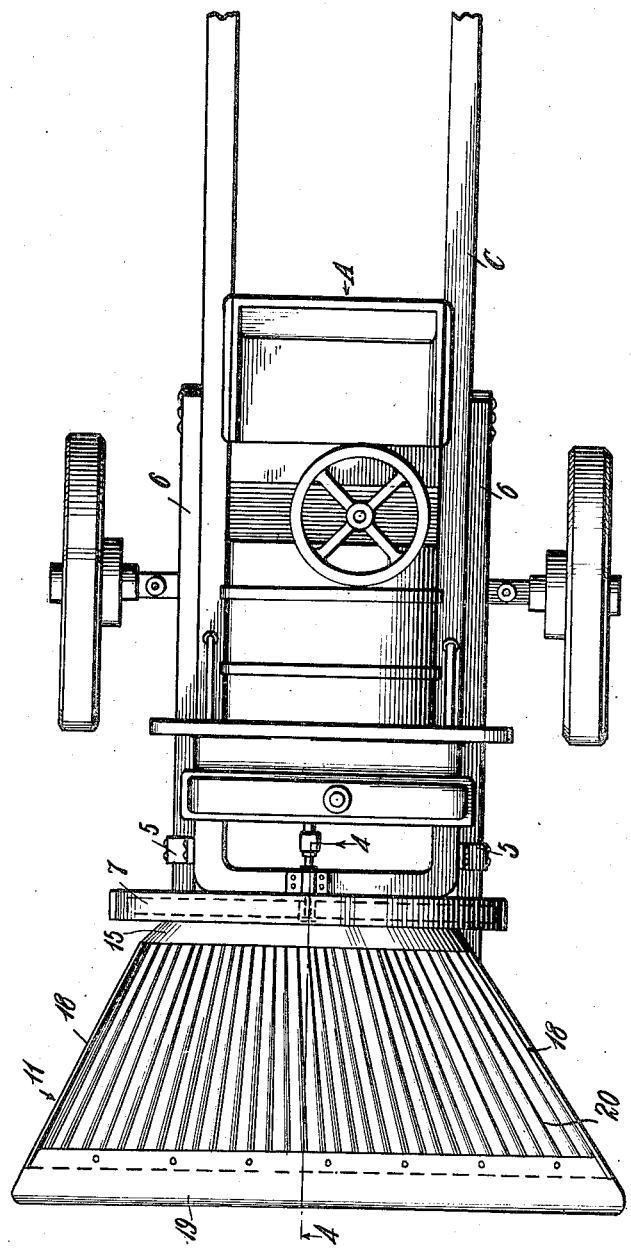
Figure 2 is a top plan view of the structure shown in Figure 1.

Referring to these drawings in detail, in which similar reference characters correspond with similar parts throughout the several views, and in which the automobile is generally indicated by the reference character A, the chassis being indicated at C, and the crank-shaft at S, the invention consists of the attachment which will now be described, as a separate article of merchandise and also in combination with the automobile.

A pair of brackets 5 are secured by any appropriate means to the opposite sides of the chassis C, and each of these brackets has a downward and forward supporting portion 6 which has an annular channel 7 secured thereto (by any appropriate means not shown), and to the front end of the extensions 6, a pair of runners 8 are hinged at 9, the portion 10 of these runners being adapted to slide on the road in front of the automobile. A scoop 11 is secured on and supported by the runners 8, the rear end of this scoop being open and in position to discharge snow in to the channel 7.

A fan or rotor 12 is secured on and rotatable with the shaft S, and the outer ends of the fan's arms or paddles extend into the channel 7 so as to engage with the snow that enters the channel. The channel is provided with an opening or snow outlet 13 through which the snow is forced by centrifugal force of the fan. The scoop 11 is mounted to provide an air inlet 14, it being understood that the greater part of the opening at the rear end of the scoop is enclosed by a funnel or forwardly extending flange 15 which is united with the channel 7, and therefore, the opening 14 is bounded by the scoop and the funnel 15. The purpose of the opening 14 will be explained hereinafter.

A rear wall or disc 16 is united with the channel 7 and has a central opening or bearing 17 through which the shaft S extends.

Referring to Figure 4, therefore, it will be seen that the shaft S supports the fan 12 within the channel 7 and behind the funnel or flange 15. It will also be seen that the side walls 18 of the scoop extend into the funnel and diverge forwardly so that the distance between their forward ends is greater than the width of the track on which the automobile travels. In other words, the walls 18 extend in front of the ground wheels of the automobile, while the rear ends of these walls are spaced from one another a distance suitably less than the distance between the ground wheels. Because of this amount of inclination of angularity to the automobile's path of travel, the snow which is lifted into the scoop, by means of its blade 19, tends to clog or become embanked against the walls 18, thus impeding the progress of the snow in passing from the scoop in the channel 17. To avoid this clogging of the snow in the scoop, its bottom or floor 20 is formed with a series of rearwardly converging corrugations, each of these acting in conjunction with the converging walls 18 to evenly concentrate the snow toward the open rear end of the scoop. When the snow has passed rearwardly to the opening 14, it is caught by a current of air which is drawn upward through the opening by suction of the fan 12, thereby assisting the fan in sucking the snow into its casing which includes the channel 7. The fan 12 rotates in the direction of the arrow and the centrifugal force of this fan throws the snow outward through the opening 13 away from the path of the automobile.

As the automobile moves forward, the scoop raises the snow, and the pressure of the snow in front of the scoop forces that which is within the scoop towards the channel 7, and in order that the blade 19 may approximately reach the ground or path without actually coming into contact therewith and injuring the road or the snow-shovelling device, the front ends of the runners 8 are grooved at their points of contact with the road, so that they slide on the skim of snow which passes under the blade 19, and in order to keep the runners 8 in continual contact with the path or road, regardless of slight elevations and depressions in the road the runners 8 are permitted to swing freely up and down on their hinges 9, while the rear end of the scoop moves freely in the funnel 15.

Although I have described this embodiment of my invention very specifically, it is not intended to limit the invention to these exact details and construction and arrangements to details may be made in the scope of the inventive idea as implied and claimed.

What I claim as my invention is:—

In a snow-shovelling attachment for an automobile, the combination of a fan attachable to the automobile's crank-shaft, a channel in which the fan is rotatable by means of a crank-shaft, a pair of brackets attachable to opposite sides of the automobile's chassis and having said channel secured thereto, a scoop secured on said brackets and having an air inlet in its lower rear portion and a snow outlet through which the snow can pass over the air inlets in the said channel, said channel having a snow outlet, said fan being adapted to suck air through the air inlet and thereby raise snow from said scoop to prevent clogging of the snow in the scoop's rear end.

In testimony whereof, I, affix my signature.

FRANK SHIELDS CURRIE.